(12) United States Patent
Tamura

(10) Patent No.: US 6,962,391 B2
(45) Date of Patent: Nov. 8, 2005

(54) OPEN ROOF STRUCTURE FOR VEHICLE

(75) Inventor: Michio Tamura, Utsunomiya (JP)

(73) Assignee: Homda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/821,299

(22) Filed: Apr. 9, 2004

(65) Prior Publication Data

US 2005/0225124 A1  Oct. 13, 2005

(51) Int. Cl.$^7$ ............................................. B60J 7/047
(52) U.S. Cl. ................................................. 296/216.03
(58) Field of Search .................... 296/216.02–216.03, 296/107.16–107.17

(56) References Cited

U.S. PATENT DOCUMENTS

| | | | |
|---|---|---|---|
| 5,033,789 A | * | 7/1991 | Hayashi et al. ........ 296/216.02 |
| 5,078,447 A | | 1/1992 | Klein et al. |

FOREIGN PATENT DOCUMENTS

| | | | | |
|---|---|---|---|---|
| GB | 320242 | * | 10/1929 | ............ 296/216.03 |
| GB | 871469 | * | 6/1961 | |
| JP | 359048230 | * | 3/1984 | ............ 296/216.02 |
| JP | 361016128 | * | 1/1986 | ............ 296/216.03 |
| JP | 363265724 | * | 11/1988 | ............ 296/216.03 |
| JP | 363265725 | * | 11/1988 | ............ 296/216.03 |
| JP | 7-69070 | | 3/1995 | |

* cited by examiner

Primary Examiner—Dennis H. Pedder
(74) Attorney, Agent, or Firm—Hamre, Schumann, Mueller & Larson, P.C.

(57) ABSTRACT

An open roof structure for opening and closing a roof of a vehicle includes a pair of link members that support the roof such that the roof is movable forward and backward relative to the vehicle body, the link members being provided in spaced relation in a width direction of the vehicle body; and a link rod that connects the link members such that the link members rotate with rotation of the link rod. The need for a space for storing the roof is eliminated and the roof is opened and closed with a simple structure.

4 Claims, 4 Drawing Sheets

OPEN ROOF STRUCTURE FOR VEHICLE

BACKGROUND OF THE INVENTION

1. Field of the Invention

The present invention relates to an open roof structure for a vehicle.

2. Description of Related Art

Among automobiles, there are ones in which the roof can be opened and closed so as to give an occupant a feeling of spaciousness. Furthermore, as proposed, for example, in Japanese Patent Application Unexamined Publication No. 7-69070, there are automobiles in which a variety of open roof forms are realized by selecting the storing attitude of the roof.

In such a vehicle with an open roof structure, it is necessary to secure a storing space in the trunk or rear hatch for storing the roof which is constructed so as to be retractable.

However, if a space for storing the roof is secured in, for example, the trunk, a problem arises in that the trunk space is reduced.

Moreover, there is a problem that if the movement distance between the roof and the storing place is large, a large electrical apparatus is required to move the roof. In addition, if this movement is done manually, such operation will be troublesome.

SUMMARY OF THE INVENTION

The present invention has been made in view of the above, and an object thereof is to provide an open roof structure that does not require a roof-storing space, and that enables opening and closing of the roof with a simple structure.

In order to solve the above problems, according to an aspect of the present invention, there is provided an open roof structure for opening and closing a roof of a vehicle, the open roof structure comprising: a pair of link members that support the roof such that the roof is movable forward and backward relative to the vehicle body, the link members being provided in spaced relation in the width direction of the vehicle body; and a link rod that connects the link members such that the link members rotate with rotation of the link rod.

With the structure as mentioned above, it becomes possible, when opening and closing the roof, for the roof to be rotated in synchronization with the link rod through the left and right link members such that the roof is moved outside the vehicle body.

According to another aspect of the present invention, there is provided an open roof structure for opening and closing a roof of a vehicle, comprising: a pair of first link members supported at lower ends thereof on a vehicle body at positions on a rear portion of a roof mount section, spaced in a width direction of the vehicle body, such that the first link members are rotatable forward and backward relative to the vehicle body; a pair of second link members supported at lower ends thereof on a vehicle body at positions on the rear portion of the roof mount section, spaced in the width direction of the vehicle body, such that the second link members are rotatable forward and backward relative to the vehicle body, the first link members and the second link members having upper ends thereof rotatably supported on an underside of the roof at corresponding positions; and at least one link rod that connects either one of the pairs of the first link members and the second link members such that the pair of the first or second link members connected by the link rod rotate with rotation of the link rod.

Preferably, the open roof structure further comprises a motor that reverseably rotationally drives the link rod.

With the structure as mentioned above, when, for example, opening the roof, by rotating either one of the pair of the first link members and the pair of the second link members on their lower ends, all the link members including the pair of the first link members that are rotatable in synchronization by the link rod and the second link members, are rotated rearwardly on their lower ends. Consequently, the roof is moved upwardly from the closed position while proceeding to open the roof mount section, and is gradually further moved into the open position by the rotation of the first and second link members. When the first link members and the second link members reach the end of rotation, the roof is located outside the vehicle body extending in a rearward direction of the vehicle and fully opens the upper portion of the vehicle cabin.

DETAILED DESCRIPTION OF THE INVENTION

An embodiment of the present invention will now be described with reference to the attached drawings.

Figure 1:
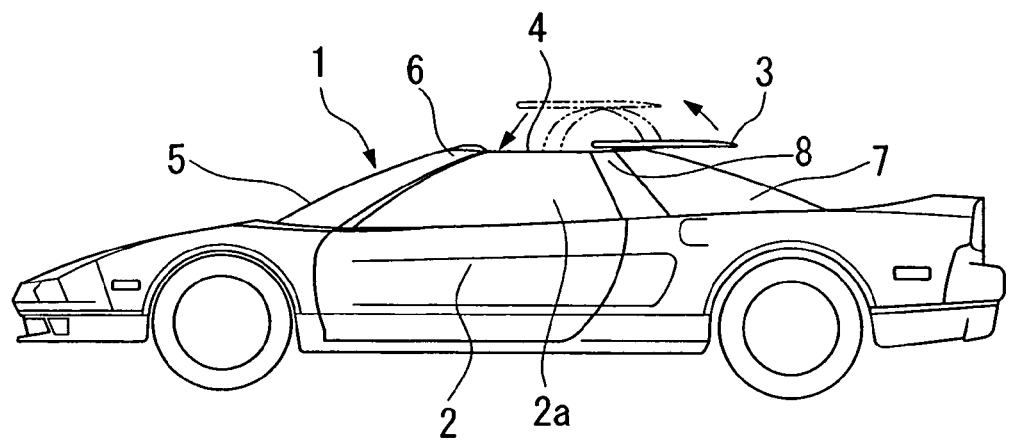
FIG. 1 is a side view of a vehicle with an open roof structure according to an embodiment of the present invention.

As shown in FIG. 1, a vehicle 1 is a vehicle with an open roof structure that has sashless doors 2 and a roof 3 retractably provided at an upper portion of the vehicle body.

The roof 3 moves rearwardly from a fully closed position to a fully opened position through a later-described opening and closing mechanism, in which in the fully opened position, the roof 3 is located outside the vehicle body, with the front side thereof positioned at a rear portion of a roof mount section 4, and with the rear side thereof extending in a rearward direction of the vehicle body to open the upper portion of the vehicle cabin.

Figure 2:
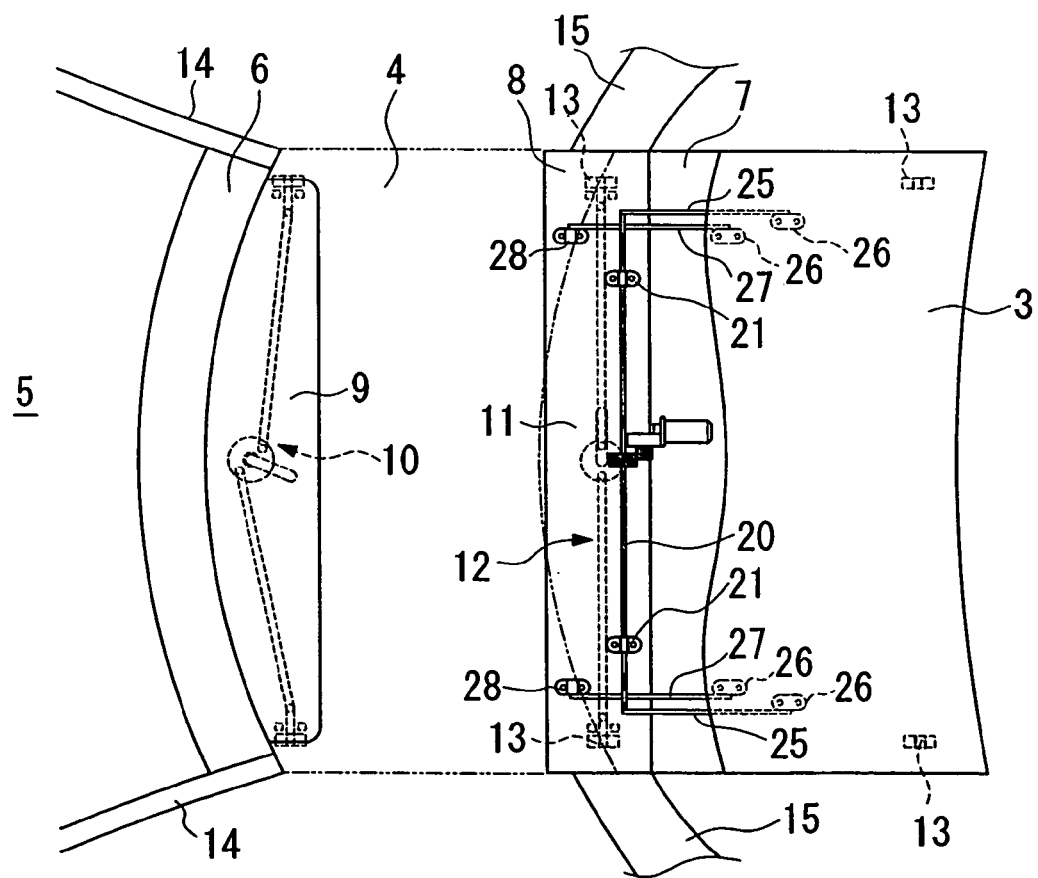
FIG. 2 is a plan view of the vehicle with the open roof structure according to an embodiment of the present invention.
Figure 3:
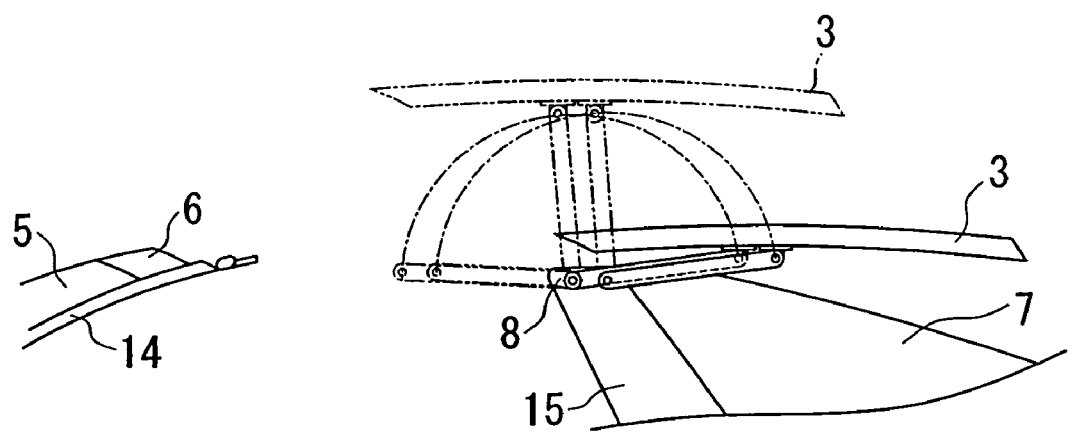
FIG. 3 is a side view of the open roof structure shown in FIG. 2.

As shown in FIGS. 2 and 3, the roof mount section 4 at the upper portion of the vehicle cabin is constructed by a front roof rail portion 6 at an upper edge of a front windshield 5, and a rear roof rail portion 8 at an upper edge of a rear windshield 7. A front shelf portion 9 is formed at the front roof rail portion 6, and a front locking device 10 is mounted inside the front shelf portion 9. In addition, a rear shelf portion 11 is formed at the rear roof rail portion 8, and a rear locking device 12 is mounted inside the rear shelf portion 11. Note that each of the front and rear locking devices 10 and 12 has only an arm 16 (described below) projecting into the vehicle cabin to allow operation of the locking devices.

The roof 3, when in the state closing the roof mount section 4, i.e., the upper portion of the vehicle cabin, is disposed to cover the front shelf portion 9 and the rear shelf portion 11, and the front side thereof comes into close contact with the front roof rail portion 6 through a weather strip (not shown), and the rear side comes into close contact with the rear roof rail portion 8 through a weather strip (not shown).

At four corners on the underside of the roof 3, i.e., at both front lateral sides and both rear lateral sides, a catcher 13 is attached that engages with the front locking device 10 and the rear locking device 12 in a width direction of the vehicle.

A front pillar 14 is provided on both lateral sides of the front windshield 5, and a rear pillar 15 is provided on both lateral sides of the rear windshield 7. A side windshield 2a of the sashless door 2 (see FIG. 1) is vertically movable and comes into close contact with the region defined by the front pillar 14, the rear pillar 15, and a lateral side of the roof 3 in the closed position through a weather strip (not shown).

Although the front locking device 10 and the rear locking device 12 have been shown to be mounted inside the front shelf portion 9 and the rear shelf portion 11, respectively, a structure may be employed in which they are mounted on the top surfaces or the bottom surfaces of the front shelf portion 9 and the rear shelf portion 11, provided that they can lock the roof 3.

Figure 4:
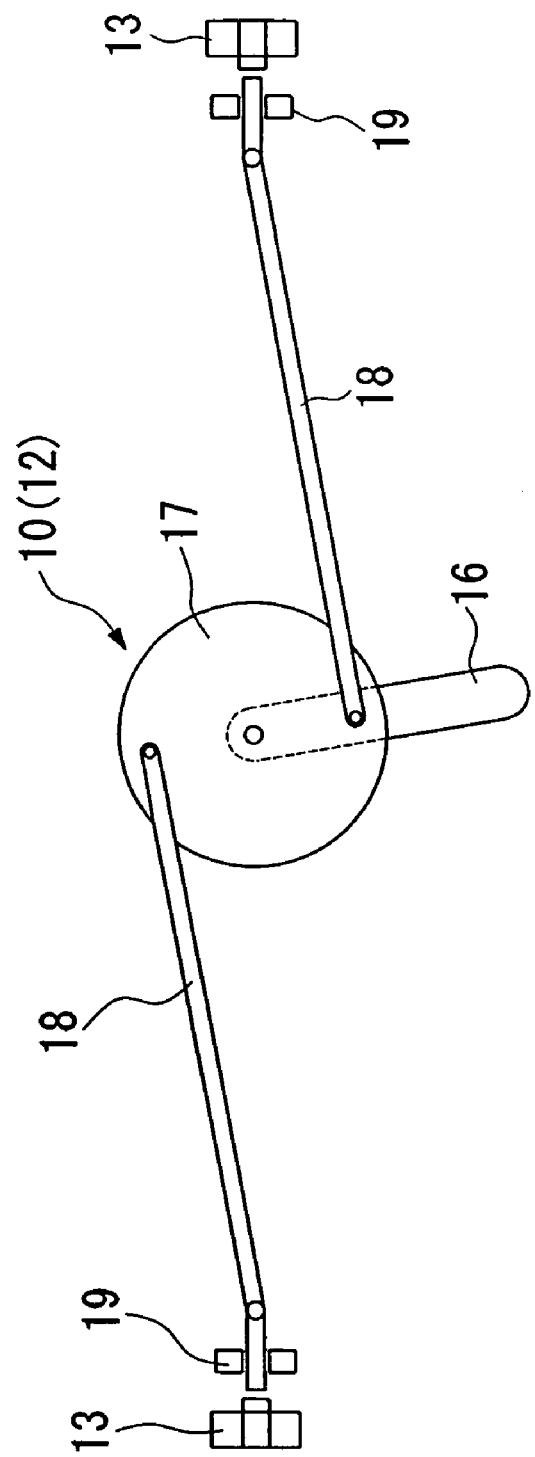
FIG. 4 is a schematic view of a front locking device and a rear locking device usable with an embodiment of the present invention.

The front locking device 10, as schematically shown in FIG. 4, is a conventional device made up of a disk-like rotational member 17 with an arm 16, and a pair of locking arms 18 extending in the width direction of the vehicle and having their base ends rotatably supported at opposed outer circumferential portions of the rotational member 17. The front end portion of each locking arm 18, which is made rotatable through a joint pin, is guided by a guide bracket 19, and the tip end of each locking arm 18 projects from the guide bracket 19 by the locking operation at the arm 16 and engages in the related one of the catchers 13 and 13 at the front lateral sides on the underside of the roof 3 when closing the roof 3. By the unlocking operation at the arm 16, the tip end of each locking arm 18 is retracted to unlock the roof 3.

The rear locking device 12, like the front locking device 10, is a device having a rotational member 17 with an arm 16, locking arms 18 and 18, and guide brackets 19 and 19. The front end of each locking arm 18 that is made rotatable through a joint pin and projects from the related guide bracket 19 engages in the corresponding one of the catchers 13 and 13 at the rear lateral sides on the underside of the roof 3 when closing the roof 3, and engages in the corresponding one of the catchers 13 and 13 at the front lateral sides on the underside of the roof 3 when opening the roof 3. Note that the same constituent parts as those of the front locking device 10 are given the same symbols and their description is omitted.

Figure 5:
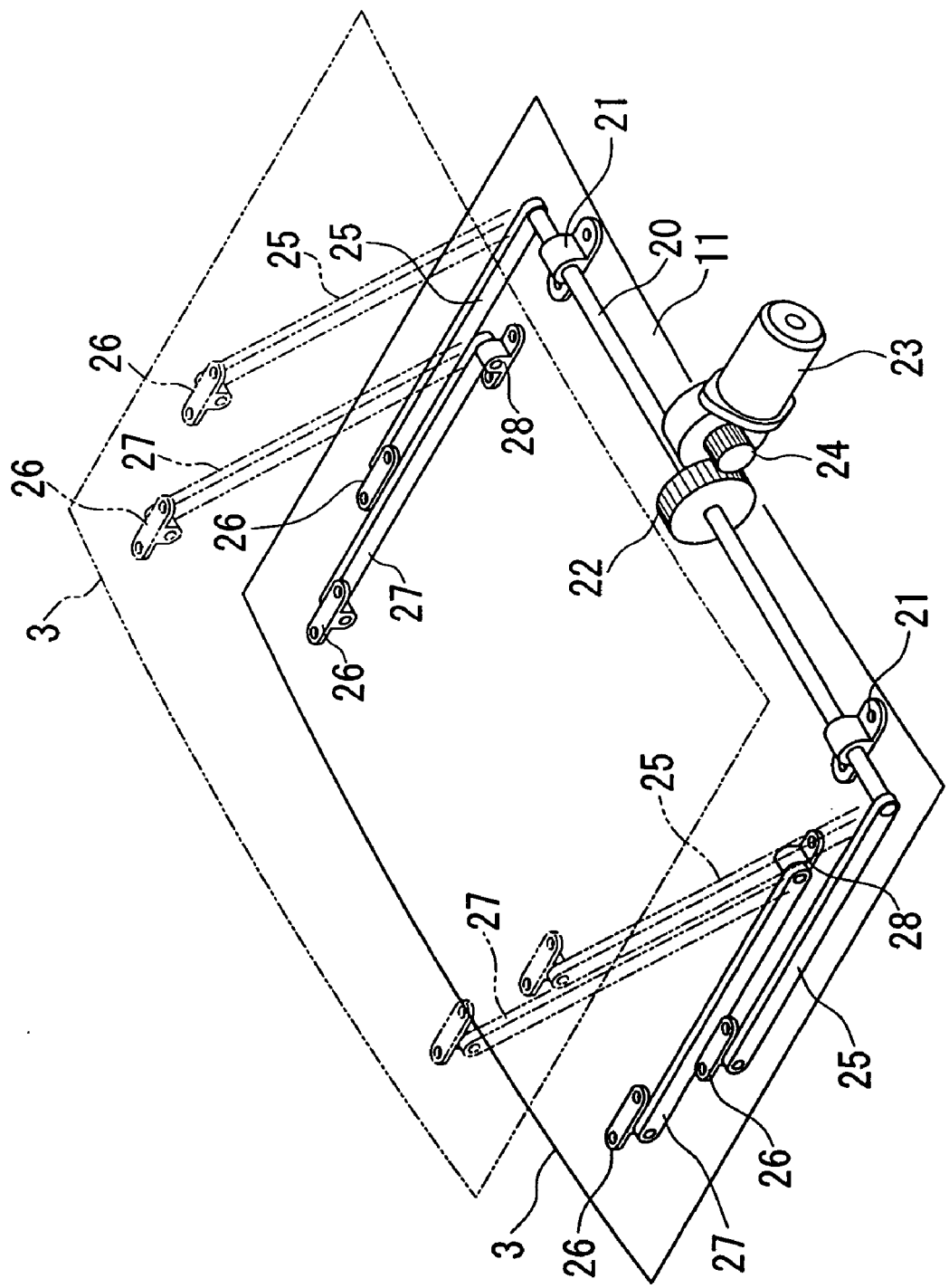
FIG. 5 is a perspective view of an opening and closing mechanism according to an embodiment of the present invention.

FIG. 5 shows a principal portion of an opening and closing mechanism provided between the roof 3 and the roof mount section 4, through which the roof 3 is retractably supported. The roof 3 moves rearwardly through the opening and closing mechanism and, when in the fully opened position, is located outside the vehicle body, with the front side thereof positioned at a rear portion of the roof mount section 4, and with rear side thereof fixed extending substantially horizontally in a rearward direction of the vehicle body. The opening and closing mechanism is constructed by first link members 25 (described below), second link members 27, a link rod 20, a motor 23, a sector gear 24, a drive gear 22, the front locking device 10, the rear locking device 12, and the catchers 13.

The link rod 20, which extends in the width direction of the vehicle, is rotatably supported on the rear shelf portion 11 through a pair of main brackets 21. The drive gear 22 is attached near the center of the link rod 20 in the width direction of the vehicle, which drive gear 22 meshes with the sector gear 24 associated with the motor 23 fixed to the rear shelf portion 11.

Each first link member 25 is attached at the lower end to the link rod 20 at both ends. A bracket 26 is secured to the upper end of each first link member 25 in a rotatable manner about an axis extending in the width direction of the vehicle, and the bracket 26 is in turn secured to the underside of the roof 3. Consequently, if the drive gear 22 and thus the link rod 20 are rotated by the motor 23 through the sector gear 24, both the first link members 25 are rotated in synchronization to rotate the brackets 26 from the front to the rear side.

Furthermore, the second link members 27 are disposed inside, and in the vicinity of, the first link members 25. The second link members 27 are supported at the lower ends on the rear shelf portion 11 through related sub-brackets 28 attached forwardly of the main brackets 21, so as to be rotatable about an axis extending in the width direction of the vehicle.

The bracket 26 is attached to the upper end of each second link member 27 in a rotatable manner about an axis extending in the width direction of the vehicle, which bracket is in turn attached to the underside of the roof 3.

Thus, a quadric link mechanism comprised of first link members 25 and second link members 27, provided at the roof mount section 4, supports the roof mount section 4 at the left and right side, and the first link members 25 and the second link members 27 are rotated in synchronization through the link rod 20.

According to the embodiment as described above, in order to open the roof 3 from its closed position, the arm 16 of the front locking device 10 and of the rear locking device 12 is rotated in the unlocking direction, and then the motor 23 is driven in the opening direction so as to drive the drive gear 22 through the sector gear 24. The link rod 20 then rotates to move the first link members 25 upwardly as shown by the chain lines in FIG. 3, which are next moved rearwardly as shown by the solid lines in FIG. 2.

At this time, because each first link member 25 is fixed to the link rod 20, the left and right first link members 25 synchronize with each other to reliably move the roof 3 without disparity. At this time, the second link members 27 rotate with the rotation of the first link members 25.

Here, by adjusting the lengths of the first link members 25 and the second link members 27 as well as their mounting positions on the roof mount section 4, the roof 3 can be moved, maintained in a substantially horizontal attitude. As a result, even during running of the vehicle, the roof 3 can be moved with little resistance.

Thereafter, with the roof 3 being located in the fully opened position, the arm 16 of the rear locking device 12 is rotated in the locking direction to have the locking arms 18 engaged in the catchers 13 on the front lateral sides of the roof 3. The roof 3 is thus securely locked extending outside the vehicle body.

In this instance, the roof 3 can be made to function as a spoiler to improve the running stability of the vehicle by adjusting the lengths of the first link members 25 and the second link members 27, and their mounting positions on the roof mount section 4 such that the roof 3 in the substantially horizontal attitude will be set to the optimum attitude for that purpose.

Thus, because the roof 3 can be located outside the vehicle body, no limitations will be imposed on designing the vehicle body when employing an open roof structure as in the case where the roof 3 is stored inside the vehicle body, leading to a wide variety of selectable forms for the vehicle body.

Next, in order to close the roof 3 from its opened position, the arm 16 of the rear locking device 12 is rotated in the unlocking direction, and then the motor 23 is driven in the closing direction so as to drive the drive gear 22 through the sector gear 24. The link rod 20 then rotates to move the first link members 25 upwardly as shown by the chain lines in FIG. 3, and further forwardly until it comes into contact with the roof mount section 4 to close the upper portion of the vehicle cabin. Also in this case, because each first link member 25 is fixed to the link rod 20, the left and right first link members 25 synchronize with each other to reliably move the roof 3 without disparity. At this time, the second link members 27 rotate with the rotation of the first link members 25.

Thereafter, with the roof 3 being located in the fully-closed position, the arm 16 of the front locking device 10 and the arm 16 of the rear locking device 12 are rotated in the locking direction to have each locking arm 18 engaged in the related catcher 13 at four corners on the underside of the roof 3, thereby locking the roof 3 in the fully closed position.

Thus, according to the embodiment as described above, when opening or closing the roof 3, the first link members 25 and 25 spaced in the width direction of the vehicle are rotated in synchronization with each other through the link rod 20 to move the roof 3. As a result, the roof 3 can be opened and closed in a well-balanced manner with a simple structure.

Moreover, because a structure is employed in which the roof 3 is moved outside the vehicle body to open the vehicle body upper portion, an advantage is obtained in that there is no need to provide a space for storing the roof 3, thereby causing no limitations on designing the vehicle body. In addition, because of the short distance over which the roof 3 is moved, the electric power consumption can be advantageously reduced.

Note that the present invention is not limited to the above embodiment, and the left and right first link members 25, for example, are not limited to have the structure as described above, provided that the first link members 25 can be rotated in synchronization by means of the link rod 20. In addition, the front locking device 10 and the rear locking device 12 are not limited to have the structure as described above, provided they can lock the roof 3 to the vehicle body.

Furthermore, although the roof 3 has been shown to be driven by the motor 23 in the above embodiment, the present invention is also applicable to a structure in which the roof 3 is opened and closed by manually operating a handle in place of using the motor 23. In this case, as compared with the case where the roof 3 is stored in the trunk, because of the shortness of the movement distance of the roof 3, a reduction can be made in time and effort for opening and closing the roof 3.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An open roof structure for opening and closing a roof of a vehicle with a rear shelf portion formed at a rear rail portion on the upper end of a rear windshield, comprising:
    a pair of link members supported at lower ends thereof on a vehicle body at positions on the rear shelf portion, spaced in a width direction of the vehicle body;
    a bracket attached to the rear shelf portion of the vehicle, rotatably supporting the lower end of each link member, the link members having upper ends thereof rotatably supported on an underside of the roof such that the link members are rotatable forward and backward relative to the vehicle body; and
    a link rod that connects the link members such that the link members rotate with rotation of the link rod.

2. An open roof structure for opening and closing a roof of a vehicle with a rear shelf portion formed at a rear rail portion on the upper end of a rear windshield, comprising:
    a pair of first link members supported at lower ends thereof on a vehicle body at positions on the rear shelf portion, spaced in a width direction of the vehicle body, such that the first link members are rotatable forward and backward relative to the vehicle body;
    a first bracket attached to the rear shelf portion of the vehicle, rotatably supporting the lower end of said first link members;
    a pair of second link members supported at lower ends thereof on a vehicle body at positions on the rear shelf portion, spaced in the width direction of the vehicle body, such that the second link members are rotatable forward and backward relative to the vehicle body;
    a second bracket attached to the rear shelf portion of the vehicle rotatably supporting the lower end of said second link members; and
    the first link members and the second link members having upper ends thereof rotatably supported on an underside of the roof at corresponding positions; and
    a link rod connecting one of the pairs of the first link members and the second link members such that the pair of the first or second link members connected by the link rod rotate with rotation of the link rod.

3. The open roof structure according to claim 2, further comprising a motor that reverseably rotationally drives the link rod.

4. An open roof structure for opening and closing a roof of a vehicle with a rear shelf portion formed at a rear rail portion on the upper end of a rear windshield, comprising:
    a pair of first link members supported at lower ends thereof on a vehicle body at positions on the rear shelf portion, spaced in a width direction of the vehicle body, such that the first link members are rotatable forward and backward relative to the vehicle body;
    a pair of second link members supported at lower ends thereof on a vehicle body at positions on the rear shelf portion, spaced in the width direction of the vehicle body, such that the second link members are rotatable forward and backward relative to the vehicle body, the first link members and the second link members having upper ends thereof rotatably supported on an underside of the roof at corresponding positions; and at least one link rod that connects either one of the pairs of the first link members and the second link members such that the pair of the first or second link members connected by the link rod rotate with rotation of the link rod;

wherein either one of the pairs of the first link members and the second link members are laterally offset of the other pair of link members, wherein, the lower end of each first and second link member is rotatably supported by a bracket attached to the rear shelf portion of the vehicle; and wherein, the upper end of each first and second link member is rotatably supported by a bracket attached to the underside of the roof.

* * * * *